UNITED STATES PATENT OFFICE.

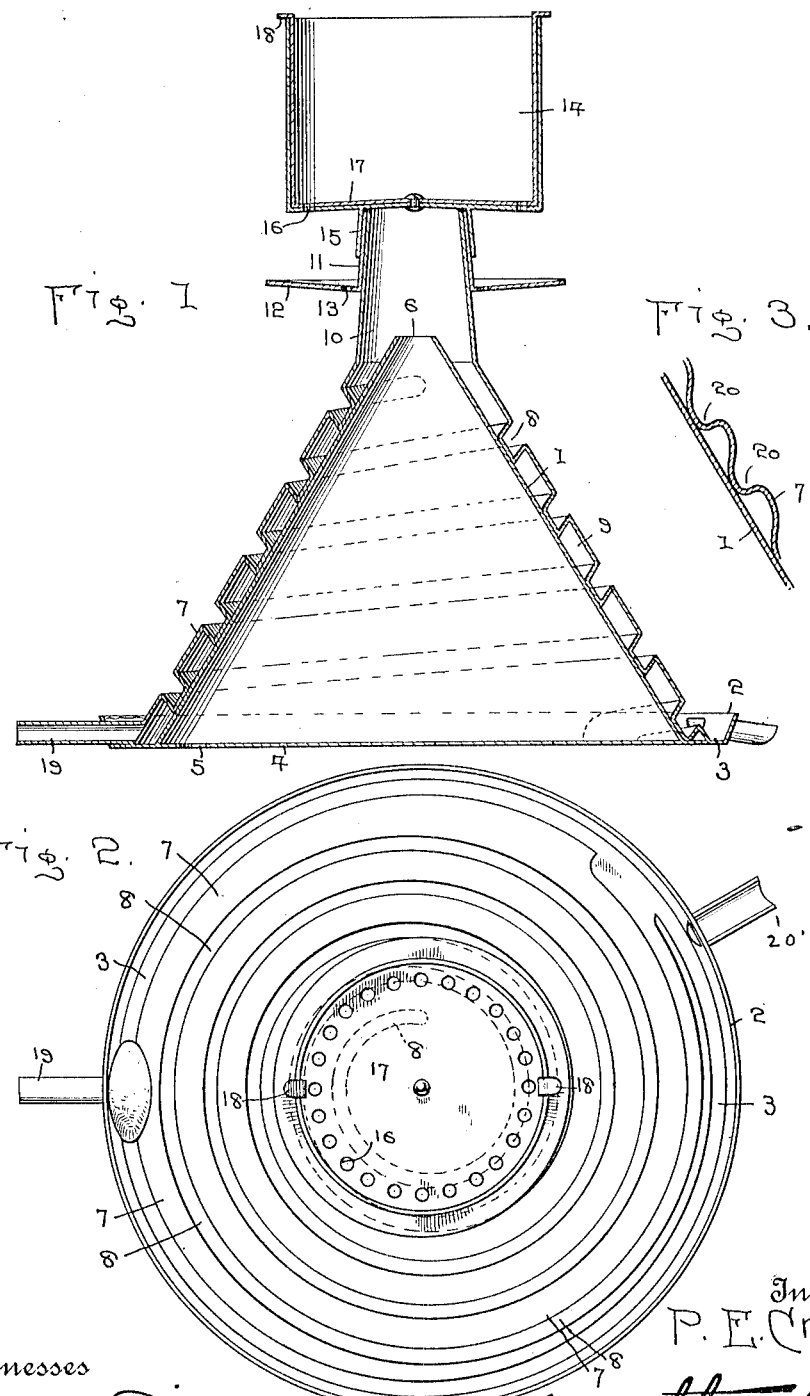

PATTERSON E. CRANSTON, OF VIOLA, WISCONSIN.

MILK-COOLER.

1,089,692. Specification of Letters Patent. Patented Mar. 10, 1914.

Application filed June 14, 1913. Serial No. 773,671.

*To all whom it may concern:*

Be it known that I, PATTERSON E. CRANSTON, a citizen of the United States, residing at Viola, in the county of Richland and State of Wisconsin, have invented certain new and useful Improvements in Milk-Coolers; and I do hereby declare the following to be a full, clear, and exact description of the invention, such as will enable others skilled in the art to which it appertains to make and use the same.

This invention relates to devices for cooling and aerating milk.

The object of the invention is to provide a cooler of conical formation having a circuitous milk channel and an inner circuitous water passage, so arranged that the milk is permitted to flow downwardly through the channel and the water is forced upwardly through the passage in greater volume, consequently lowering the temperature of the milk to that of the water.

In the accompanying drawing, Figure 1 represents a vertical sectional view through the cooler, Fig. 2 represents a top plan view thereof, and, Fig. 3 represents a fragmentary sectional view of the inner and outer cones, showing another form of milk channel in the latter.

Referring to the drawing, wherein similar reference numerals designate corresponding parts throughout the several views, 1 indicates an inner cone having an outer peripheral flange 2 forming the gutter 3 between the wall of said cone and said flange. A bottom 4 having an opening 5 therein is provided for the inner cone, the apex of the latter being cut away to provide an opening 6 for a purpose which will be hereinafter described. The outer cone 7 is formed of sheet material and suitably depressed to form the spiral channel 8. The inner cone 1 fits snugly against the inner wall of the spiral channel 8 so as to form between the inner and outer cones a spiral passage 9. The outer cone 7 terminates in an upstanding tubular end 10, which is slightly tapered from its lower to its upper end and is adapted to receive the annular flange 11 carried by the deflector disk 12 which is provided with a plurality of openings 13, surrounding said tubular extension 10. The reservoir 14 is disposed above the cones and supported in position thereover by means of the depending sleeve 15 carried thereby and engaging over the tubular extension 10 of the outer cone 7. The bottom of the reservoir 14 is provided with a plurality of openings 16, spaced a greater distance from the tubular extension 10 than the openings 13, whereby the milk flowing from the reservoir will strike the deflector disk 12 outwardly of the opening therein and permit the fluid to flow inwardly over its concaved upper surface to the openings. A suitable valve disk 17 is pivotally mounted in the bottom of the reservoir 14 and is provided with upstanding finger grips 18 adapted to be operated to open or close the flow of milk therefrom. A suitable inlet pipe 19 is attached to the outer cone 7 and communicates with the spiral passage 9. At a point spaced from the inlet pipe 19 an outlet spout 20 for the milk is projected through the dam or flange 2 for draining the milk from the cooler.

In operation, the inlet pipe 19 is adapted to be connected with a suitable water supply, the water being under sufficient pressure to raise it within the spiral passage 9 so as to overflow the inner cone 1 and pass through the openings 6 in the upper end thereof, thence downwardly and through the outlet opening 5 in the bottom of said cone. As the water is being forced between and inside the cones, the milk contained in the reservoir 14 is permitted to flow in the desired volume through the openings in the bottom thereof, onto the concaved upper surface of the deflector disk 12, through the openings therein, and onto the outer surface of the outer cone 7. It is obvious that the milk flowing over the outer cone will follow the spiral channel 8 therein and it will be understood that the water flowing upwardly beneath the outer cone in greater volume than the milk flowing downwardly will effectively cool and aerate the latter.

In Fig. 3, 1 and 7 indicate the inner and outer cones, respectively, and 20 indicates the spiral channel in the latter which is of a slightly different formation than that shown in Fig. 1. The walls of the channel 20 are curved, in section, but it will be understood that in practice, the channel may be formed in any desired shape.

What I claim is:—

1. A milk cooler comprising an outer cone having a spiral depression therein, a reservoir disposed thereover, an inner cone having an opening in the upper end telescopically engaged within the outer cone forming a spiral passage between the walls of the spiral depression, an inlet pipe communicating with the spiral passage, and a spout communicating with the bottom of the spiral channel.

2. A milk cooler comprising an outer cone having a spiral depression providing a channel, and an inner cone telescopically engaged within the outer cone, having an open upper end and contacting the inner wall of said spiral depression providing a spiral passage between said inner and outer cones.

3. A milk cooler comprising an outer cone having a spiral depression providing a channel, an inner cone contacting the inner walls of said spiral depression and providing a spiral passage between said inner and outer cones, said inner cone having openings in the top and bottom thereof, pipe communicating with the bottom of the spiral passage, a gutter surrounding said cones.

4. A milk cooler comprising an inner and an outer spirally channeled cone in telescopic engagement providing a spiral passage therebetween, tubular extension at the upper end of said outer cone, a reservoir removably disposed over said tubular extension, and a perforate deflector disk surrounding said tubular extension below said reservoir.

In testimony whereof I have signed my name to this specification in the presence of two subscribing witnesses.

PATTERSON E. CRANSTON.

Witnesses:
S. M. GORE,
W. H. SCHROEDER.

---

Copies of this patent may be obtained for five cents each, by addressing the "Commissioner of Patents, Washington, D. C."